United States Patent [19]
Ezell et al.

[11] Patent Number: 5,662,341
[45] Date of Patent: Sep. 2, 1997

[54] METAL-TO-METAL SEAL ASSEMBLY FOR OIL AND GAS WELL PRODUCTION APPARATUS

[75] Inventors: Michael Dale Ezell, Carrollton; Glen E. Pitts, Roanoke, both of Tex.

[73] Assignee: Halliburton Company, Dallas, Tex.

[21] Appl. No.: 618,231

[22] Filed: Mar. 19, 1996

[51] Int. Cl.$^6$ .................................................. F16J 15/40
[52] U.S. Cl. ........................... 277/27; 277/164; 277/205; 277/236
[58] Field of Search ............................ 277/164, 205, 277/236, 27

[56] References Cited

U.S. PATENT DOCUMENTS

| | | | |
|---|---|---|---|
| 4,178,020 | 12/1979 | Dopyera | 277/236 |
| 4,445,694 | 5/1984 | Flaherty | 277/236 |
| 4,640,516 | 2/1987 | Almada | 277/236 |
| 5,076,594 | 12/1991 | Baugh | 277/205 |

OTHER PUBLICATIONS

Helicoflex High Performance Sealing.
Cefilac Etancheite, Carbone Lorraine, pp. 7, 17.
EnerRing Resilent Metal Seals.
Advanced Products, Design Manual, Section 5–Metal–C–Rings.

Primary Examiner—William A. Cuchlinski, Jr.
Assistant Examiner—Christina Annick
Attorney, Agent, or Firm—William M. Imwalle; Warren B. Kice

[57] ABSTRACT

A metal-to-metal seal assembly which provides a dynamic seal between two moving members yet does not require constant compressive loading. A hollow seal ring is provided having a "C"-shaped cross section and containing a coiled spring. The seal ring is disposed between two telescoped members of an expansion joint, or polished bore receptacle, in an interference fit and is flanked by two bearing rings. The seal ring is located relative to the pressurized fluid so that the fluid pressure is equalized across the ring and remains constant between the two telescoped members despite relative movement therebetween.

30 Claims, 1 Drawing Sheet

METAL-TO-METAL SEAL ASSEMBLY FOR OIL AND GAS WELL PRODUCTION APPARATUS

BACKGROUND OF THE INVENTION

The present invention relates to a metal-to-metal seal assembly and, more particularly, to such an assembly for use in oil and gas production apparatus located in a well.

It is critically important to properly seal certain components in oil and gas wells during the operation of downhole tools, after completion and testing of the well, and during production. For example, expansion joints, often referred to as "polished bore receptacles," have evolved which are connected in the production tubing string in a completed well to compensate for changes in the axial length of the tubing string due to the effects of relatively large temperature changes in the well, which would otherwise cause a compression deformation or tensile failure. A typical polished bore receptacle includes two tubular members disposed in a telescoping relationship that move relatively to each other in an axial direction in response to temperature variations, and a continuous dynamic seal is provided between the two members to prevent fluid leakage between the sliding surfaces of the two members.

Elastomer seals have been used in a variety of sealing applications in oil and gas wells, including use in the polished bore receptacles described above. However, the elastomer may lose its resiliency or shape memory after some use, which is necessary for the seal to oppose the imposed forces thereon. Also, elastomer seals tend to deteriorate with exposure to the downhole chemical and relative high temperature environments for long periods of time. Further, significant abrasion of the seal material will occur by the forces generated when there is relative movement between the two members being sealed, as is the case with polished bore receptacles. Although these deficiencies can be compensated for to a certain degree by preloading the seal, the preloading force becomes less as more and more of the seal material abrades, ultimately causing seal leakage and failure.

Therefore, to overcome these problems, metal-to-metal seals have evolved since they, for the most part, do not lose their resiliency and shape memory and are not affected by hostile environments. However, metal-to-metal seals are normally only used as static seals or as safety backup seals since the seal must remain stationary and must be under constant compression to insure that it is not compromised. Therefore, these metal-to-metal seals are not suitable for use in dynamic sealing applications, including the polished bore receptacles described above. Therefore, what is needed is a metal-to-metal seal assembly which can seal between two members which move relative to each other and which can maintain the seal without the need for constant compressive loading.

SUMMARY OF THE INVENTION

The present invention, accordingly, provides a metal-to-metal seal assembly which can provide a dynamic seal between two moving members yet does not require constant compressive loading. To this end, a hollow seal ring is provided having a "C"-shaped cross section and containing a coiled spring. The ring is disposed between two telescoped members of an expansion joint, or polished bore receptacle, in an interference fit and is flanked by two bearing rings. The seal ring is located relative to the pressurized fluid so that the fluid pressure is equalized across the seal ring and remains

2 constant between the two telescoped members despite relative movement therebetween.

As a result, the seal assembly is not subject to loss of resiliency or shape memory nor deterioration due to hostile environments. Moreover, it can establish and maintain a seal between the two telescoped members during relative movement therebetween, and does not require a constant compressive loading. Thus, a major advantage is achieved with the seal assembly of the present invention since it offers all of the advantages of a metal-to-metal seal without any of the disadvantages.

DESCRIPTION OF THE PREFERRED EMBODIMENTS

Figure 1:
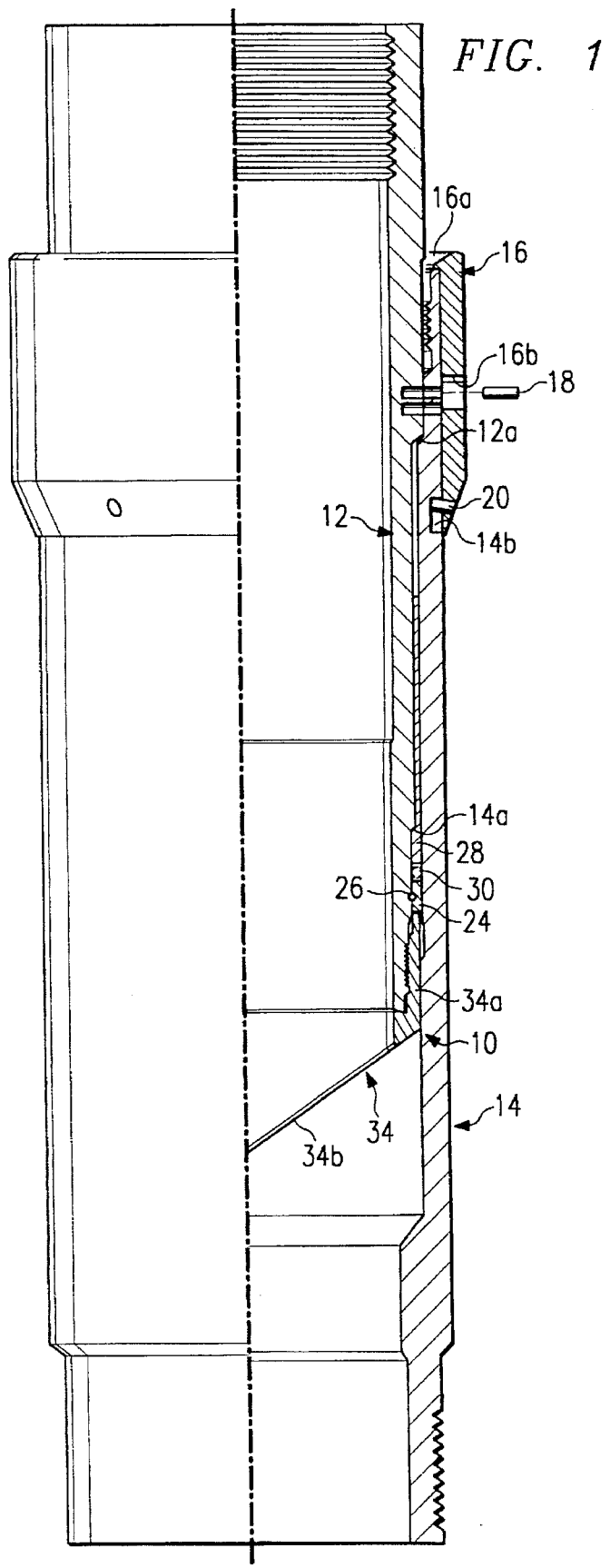
FIG. 1 is a longitudinal sectional view of the sealing assembly of the present invention.

Referring to FIG. 1 of the drawings, the reference numeral 10 refers in general, to the expansion joint, or polished bore receptacle, of the present invention which is adapted to be connected between two tubular sections (not shown) forming a portion of production tubing string in an oil or gas well. The assembly 10 consists of an inner mandrel 12 telescopically received in an outer tubular member 14. It is understood that the inner bore of the outer tubular member 14 is polished and that the entire lengths of the overlapping end portions of the mandrel 12 and the tubular member 14 are not shown in their entirety for the convenience of presentation.

The respective distal end portions of the mandrel 12 and the tubular member 14 are threaded for connection to the two tubular sections of the tubing string (not shown) in coaxial alignment. The respective inner bores of the mandrel 12, the tubular member 14 and the tubing string sections are aligned in a coaxial relationship and thus provide a continuous passage for the flow of production fluid upwardly, as viewed in FIG. 1, through the lower portion of the tubing string, the tubular member 14, the mandrel 12 and the upper portion of the string.

The mandrel 12 has a stepped outer surface and the tubular member 14 has a stepped inner surface. As a result, a shoulder 12a is defined on the outer surface of the mandrel 12 which, in the assembled condition of the assembly 10 as viewed in FIG. 1, abuts against a corresponding shoulder formed on the tubular member 14. An annular cross-sectional space is defined between the outer surface of the mandrel 12 and the inner surface of the tubular member 14, which space extends below the shoulder 12a and the corresponding shoulder of the tubular member 14. The reference numeral 14a refers to a shoulder defined on the inner surface of the tubular member 14 at which the inner diameter of the latter member increases in a direction from the upper portion to the lower portion, for reasons to be described.

A locating mandrel 16 extends over the upper end portion of the tubular member 14 and has a inwardly-directed flange 16a which engages the end of the latter member. A plurality of angularly-spaced, radially-extending openings 16b (only one of which is shown in the drawing) are formed through the locating mandrel 16 and align with corresponding openings in the tubular member 14 and the mandrel 12. A plurality of pins 18 are provided which, during assembly, pass through the openings 16a respectively, and extend in the respective aligned openings in the tubular member 14 and the mandrel 12. This locates the mandrel 12 relative to the tubular member 14 in the position shown and prevents relative axial movement therebetween. The pins 18 are adapted to shear in response to a predetermined shear force between the mandrel 12 and the tubular member 14, in a conventional manner. A threaded pin 20 extends through a threaded opening in the locating mandrel 16 and into a notch 14b formed in the upper surface of the tubular member 14 to secure the locating mandrel to the member.

A bearing ring 24 extends around the mandrel 12 and in the annular space between the mandrel 12 and the tubular member 14. Two and the inner surface of the ring 24 respectively, which receive a wire ring 26 to secure the bearing ring 24 in the position shown. Another bearing ring 28 also extends around the mandrel 12, in the latter annular space, and above the bearing ring 24 in a slightly spaced relation thereto.

Figure 2:
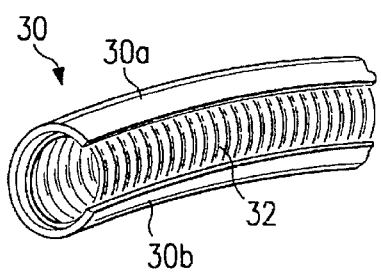
FIG. 2 is an enlarged perspective view of the seal ring of the present invention.

A seal ring 30 extends around the mandrel 12, in the annular space between the mandrel 12 and the tubular member 14, and between the bearing rings 24 and 28. As better shown in FIG. 2, the seal ring 30 has a substantially "C"-shaped cross section and, in the assembled portion shown in FIG. 1, the open portion of the C faces downwardly, i.e., in a direction facing the production fluid as it flows upwardly through the assembly 20. The "C" configuration defines two parallel sections 30a and 30b which abut the tubular member 14 and the mandrel 12, respectively, as will be described in further detail. The seal ring 30 is preferably fabricated from a metal material, and the height of the ring is slightly more than the height of the annular space between the mandrel 12 and the tubular member 14 in the portion of the annular gap in which the ring 30 is installed.

A coiled spring 32 is disposed within the seal ring 30 and extends for its entire circumference. The purpose of the spring 32 is to preload the seal ring 30 as will be described.

A mule shoe guide 34 has a cylindrical portion 34a that is threadedly connected to the leading end of the mandrel 12 and, in the assembled condition shown in FIG. 1, extends in the annular space between the end portion of the mandrel 12 and the corresponding inner surface of the tubular member 14. A tapered portion 34b extends outwardly from the cylindrical portion of the mule shoe guide 34 which functions to guide, or locate, the mandrel 12 radially relative to the tubular member 14 during assembly.

The assembly 10 is assembled by initially placing the bearing ring 24 over the outer surface of the mandrel 12 and aligning the groove in the inner surface of the ring 24 with the complementary groove in the outer surface of the mandrel 12. The wire 26 is then threaded through a tap, or opening (not shown), in the ring 24 and into the aligned grooves to secure the ring 24 against axial movement relative to the mandrel 12. The seal ring 30 and the bearing ring 28 are then advanced over the mandrel 12 until the seal ring extends between the bearing rings 24 and 28 in close proximity thereto. The mandrel 12 is then inserted, or stabbed, into the upper end of the tubular member 14, with the mule shoe guide 34 aiding in properly aligning the mandrel and the tubular member. The mandrel 12 is then advanced relatively to the tubular member 14 in a downward direction as viewed in FIG. 1 until the shoulder 12a of the mandrel 12 abuts the corresponding shoulder of the tubular member 14. During this movement, the bearing rings 24 and 28 and the seal ring 30 pass the shoulder 14a of the tubular member 14 and thus encounter the above-mentioned portion of the inner surface of the tubular member 14 in which the inner diameter of the latter member increases and the height of the annular space between the mandrel 12 and the tubular member 14 is slightly less that the height of the cross section of the ring 30. Thus, when the mandrel reaches its assembled position shown in FIG. 1, the ring 30 is secured between the mandrel and the tubular member in a strong interference fit. The locking mandrel 16 is then placed over, and secured to, the end portion of the tubular member 14, and the shear pins 18 are inserted into their respective aligned openings to secure the assembly 10 in its assembled position, ready for installation in the well.

It is understood that a plurality of packing seals and molded seals could be located between the outer member 12 and the inner member 14 including those portions thereof that are not shown in the drawings.

In operation, the assembly 10 is assembled in the manner discussed above and is connected between two sections of production tubing and lowered into the well to be serviced. The production fluid passes upwardly through the continuous bore established by the respective bores of the lower tubular string, the tubular member 14, the mandrel 12 and the upper tubular string. The assembly 10 expands and contracts in an axial direction as a result of corresponding relative telescoping movement between the mandrel 12 and the tubular member 14 in response to corresponding changes in the temperature in the well.

Although the fluid will attempt to enter the annular space between the mandrel 12 and the tubular member 14, the seal ring 30, with assistance from the bearing rings 24 and 28, prevents any ingress. More particularly, and with reference to FIGS. 1 and 2, the fluid will enter the opening defined in the "C" cross section of the ring, i.e., between the respective ends of the sections 30a and 30b. The fluid pressure acting against the seal ring 30 will be constant in the center of the "C" shaped cross-sectional portion of the ring, as well as between the tubular member 14 and the section 30a of the ring, and between the mandrel 12 and the section 30b of the ring. Also, the ring 30 is secured between the mandrel 12 and the tubular member 14 in a strong interference fit and the spring 32 functions to maintain the shape of the ring 30 during loading. As a result of all of this, the sections 30a and 30b of the ring 30 are prevented from getting bent radially inwardly away from the tubular member 14 and the mandrel 12, respectively, thus preventing collapsing of the ring. Thus, the pressure across the annular gap between the mandrel 12 and the tubular member 14 is equal and a strong seal is established. Also, the seal ring 30 is adapted for slight movement up and down as needed to accommodate the relative axial movement of the mandrel 12 and the tubular member 14.

The seal assembly 10 of the present invention thus enjoys several advantages. For example, it is not subject to loss of resiliency or shape memory nor deterioration due to hostile environments. Moreover it can establish and maintain a seal between the two telescoped members during relative movement therebetween, and does not require a constant compressive force.

It is understood that variations may be made in the foregoing without departing from the scope of the present invention. For example, the cross section of seal ring 30 does not have to be "C" shaped as long as the above design goals of the invention are achieved. For example, the seal ring could have a "W"-shaped cross section, or a solid cross section with bores being drilled therethrough to achieve the fluid pressure equalization discussed above. Also, the seal assembly 10 of the present invention is not limited to application of the expansion joint or polished bore receptacle discussed above but rather is equally applicable to other comparable sealing applications. Also, although the mandrel 12 and the tubular member 14 are each shown in the form of one continuous member, it is understand that each could be made up of several sections.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A metal-to-metal seal assembly for providing a dynamic fluid seal between two members which move relative to each other, said seal assembly comprising a hollow seal ring extending between the members in an interference fit and having a cross-sectional area defining an opening, the ring being configured and positioned relative to the two members for receiving into the cross-sectional area fluid to be sealed to equalize the fluid pressure across the seal ring.

2. The seal assembly of claim 1 wherein the two members are assembled in a telescoping relationship and move relative to each other in response to temperature variations.

3. The seal assembly of claim 2 further comprising a guide member attached to the inner telescoping member for guiding the inner telescoping member into the outer member during assembly thereof.

4. The seal assembly of claim 2 wherein the seal ring is disposed in an annular space defined between the telescoping portion of the telescoping member, and wherein the outer surface of the overlapping portion of one of the members increases in diameter in a direction from one end of the member to the other so that the distance between the members is slightly less than the height of the seal ring so that an interference fit is established between the ring and the two members.

5. The seal assembly of claim 1 wherein the cross section of the ring is "C" shaped and defines two parallel sections which respectively abut the two members in an interference fit.

6. The seal assembly of claim 1 further comprising a coiled spring disposed in the opening in the seal ring.

7. The seal assembly of claim 1 further comprising a pair of axially-spaced bearing rings extending between the two members, the seal ring extending between the bearing rings.

8. The seal assembly of claim 1 wherein the movement of the two members relative to each other occurs subsequent to the assembly of the seal assembly for operation.

9. The seal assembly of claim 1 wherein the movement of the two members relative to each other occurs during operation of the seal.

10. The seal assembly of claim 1 wherein the dynamic fluid seal does not inhibit operable movement of the two members relative to each other.

11. A metal-to-metal seal assembly for providing a dynamic fluid seal between two members which move relative to each other, said seal assembly comprising a hollow seal ring extending between the members in an interference fit and having a cross-sectional area defining an opening configured for receiving into the cross-sectional area fluid to be sealed to equalize the fluid pressure across the seal ring.

12. The seal assembly of claim 11 wherein the movement of the two members relative to each other occurs subsequent to the assembly of the seal assembly for operation.

13. The seal assembly of claim 11 wherein the movement of the two members relative to each other occurs during operation of the seal.

14. The seal assembly of claim 11 wherein the dynamic fluid seal does not inhibit operable movement of the two members relative to each other.

15. The seal assembly of claim 11 wherein the two members are assembled in a telescoping relationship and move relative to each other in response to temperature variations.

16. The seal assembly of claim 15 further comprising a guide member attached to the inner telescoping member for guiding the inner telescoping member into the outer member during assembly thereof.

17. The seal assembly of claim 15 wherein the seal ring is disposed in an annular space defined between the telescoping portion of the telescoping member, and wherein the outer surface of the overlapping portion of one of the member, and wherein the outer surface of the overlapping portion of one of the members increases in diameter in a direction from one end of the member to the other so that the distance between the members is slightly less than the height of the seal ring so that an interference fit is established between the ring and the two members.

18. The seal assembly of claim 11 wherein the cross section of the ring is C-shaped and defines two parallel sections which respectively abut the two members in an interference fit.

19. The seal assembly of claim 11 further comprising a coiled spring disposed in the opening of the ring.

20. The seal assembly of claim 11 further comprising a pair of axially-spaced bearing rings extending between the two members, the seal ring extending between the bearing rings.

21. A metal-to-metal seal assembly for providing a dynamic fluid seal between two members which move relative to each other, and seal assembly comprising a hollow seal ring extending between the members in an interference fit and having a cross-sectional area defining an opening through which fluid to be sealed may enter into the cross section of the ring to equalize the fluid pressure across the seal ring.

22. The seal assembly of claim 21 wherein the movement of the two members relative to each other is subsequent to the assembly of the seal assembly for operation.

23. The seal assembly of claim 21 wherein the movement of the two members relative to each other occurs during operation of the seal.

24. The seal assembly of claim 21 wherein the dynamic fluid seal does not inhibit operable movement of the two members relative to each other.

25. The seal assembly of claim 21 wherein the two members are assembled in a telescoping relationship and move relative to each other in response to temperature variations.

26. The seal assembly of claim 25 further comprising a guide member attached to the inner telescoping member for guiding the inner telescoping member into the outer member during assembly thereof.

27. The seal assembly of claim 25 wherein the seal ring is disposed in an annular space defined between the telescoping portion of the telescoping member, and wherein the outer surface of the overlapping portion of one of the members increases in diameter in a direction from one end of the member to the other so that the distance between the members is slightly less than height of the seal ring so that an interference fit is established between the ring and the two members.

28. The seal assembly of claim 21 wherein the cross section of the ring is "C" shaped and defines two parallel sections which respectively abut the two members in an interference fit.

29. The seal assembly of claim 21 further comprising of a coiled spring disposed in the opening in the ring.

30. The seal assembly of claim 21 further comprising a pair of axially-spaced bearing rings extending between the two members, the seal ring extending between the bearing rings.

* * * * *